(12) United States Patent
Evans

(10) Patent No.: US 8,468,822 B1
(45) Date of Patent: Jun. 25, 2013

(54) CHARGE PREPARATION SYSTEM FOR INTERNAL COMBUSTION ENGINES

(76) Inventor: Rix E. Evans, Youngsville, NC (US)

( * ) Notice: Subject to any disclaimer, the term of this patent is extended or adjusted under 35 U.S.C. 154(b) by 231 days.

(21) Appl. No.: 13/070,886

(22) Filed: Mar. 24, 2011

Related U.S. Application Data

(60) Provisional application No. 61/420,408, filed on Dec. 7, 2010.

(51) Int. Cl.
F02B 33/44 (2006.01)

(52) U.S. Cl.
USPC ................................. 60/606; 60/611

(58) Field of Classification Search
USPC .................................. 60/605.1, 611
See application file for complete search history.

(56) References Cited

U.S. PATENT DOCUMENTS

| | | | |
|---|---|---|---|
| 4,068,635 A | 1/1978 | Yunick | |
| 4,077,219 A * | 3/1978 | Melchior et al. | 60/599 |
| 4,078,387 A * | 3/1978 | Melchior et al. | 60/606 |
| 4,166,435 A | 9/1979 | Kiang | |
| 4,167,166 A | 9/1979 | Varner et al. | |
| 4,320,725 A * | 3/1982 | Rychlik et al. | 123/188.14 |
| 4,467,752 A | 8/1984 | Yunick | |
| 4,483,150 A * | 11/1984 | Melchior et al. | 60/599 |
| 4,489,700 A | 12/1984 | Van der Weide | |
| 4,503,833 A | 3/1985 | Yunick | |
| 4,592,329 A | 6/1986 | Yunick | |
| 4,637,365 A | 1/1987 | Yunick | |
| 4,862,859 A | 9/1989 | Yunick | |
| 5,036,668 A * | 8/1991 | Hardy | 60/599 |
| 5,058,536 A * | 10/1991 | Johnston | 123/51 BA |
| 5,081,977 A | 1/1992 | Swenson | |
| 5,653,202 A * | 8/1997 | Ma | 123/184.43 |
| 5,845,481 A | 12/1998 | Briesch et al. | |
| 6,553,959 B2 * | 4/2003 | Xu et al. | 123/295 |
| 6,718,960 B2 | 4/2004 | Someno et al. | |
| 7,213,585 B2 | 5/2007 | Yang | |
| 7,237,532 B2 | 7/2007 | Gray, Jr. | |
| 2002/0194846 A1 | 12/2002 | Moody | |
| 2003/0111045 A1 | 6/2003 | Bruch et al. | |
| 2005/0034712 A1 | 2/2005 | Guerrero | |
| 2005/0081523 A1 | 4/2005 | Breitling et al. | |
| 2009/0025395 A1 * | 1/2009 | Nilsson et al. | 60/748 |
| 2009/0235903 A1 | 9/2009 | Yang et al. | |
| 2010/0064692 A1 * | 3/2010 | Lam | 60/737 |

* cited by examiner

Primary Examiner — Thomas Denion
Assistant Examiner — Ngoc T Nguyen
(74) Attorney, Agent, or Firm — Coats & Bennett, P.L.L.C.

(57) ABSTRACT

A process and electromechanical system for conditioning the incoming air or air/fuel charge for an internal combustion engine to result in an optimally prepared charge in terms of temperature of the charge and fuel dispersion in the charge. The process includes compressing intake air, bifurcating the compressed intake air stream to provide for heating one branch of the stream while not further purposely heating the other. The process further includes controlling the proportion between the bifurcated stream portions to provide for a desired set point temperature of the combined stream. The process includes selection of the set point temperature such that the temperature of the air is in the vicinity of the fuel self ignition temperature at the end of the compression stroke. Primary components include one or more of an air compressor, heat exchanger, bypass duct, proportioning valve, airflow director, and attendant control system including sensors, processor, and actuator(s).

15 Claims, 4 Drawing Sheets

CHARGE PREPARATION SYSTEM FOR INTERNAL COMBUSTION ENGINES

CROSS REFERENCE TO PROVISIONAL APPLICATION

This application claims priority under 35 U.S.C. §119(e) from the following U.S. provisional application: Application Ser. No. 61/420,408 filed on Dec. 7, 2010. That application is incorporated in its entirety by reference herein.

FIELD OF INVENTION

The present invention relates to methods and systems for preparation of air-fuel charges for internal combustion engines. The invention more particularly relates to controlling the temperature of an air-fuel charge when the charge is admitted to a combustion chamber, with additional swirl induction as needed to accommodate fuels that do not combust smoothly.

BACKGROUND

All internal combustion engines require a fresh charge of air and fuel. Gaseous air is mixed with fuel to form the charge. The fuel may be incorporated with the air prior to the being admitted into the combustion chamber by carburetion or fuel injection. Alternatively, the fuel may be injected into a charge of air in the combustion chamber at a point near the end of the compression stroke, as in a Diesel Cycle engine. There may be combinations of these two approaches as well.

Internal combustion engines may be generally classified as spark ignition or compression ignition engines. The well known Otto cycle is the basis for typical spark ignition engines and the Diesel cycle is the basis for compression ignition engines. internal combustion engines operate by admitting a charge of air or a fuel-air mixture during an intake phase or stroke of each cycle, compressing the charge during a compression phase or stroke, and causing the charge, with fuel added, to ignite to initiate a power phase or stroke. Products of combustion are ejected during an exhaust phase or stroke. Fuel may be added by inducing liquid fuel into air before the charge is admitted into the engine, as is the case, for example, with the well known methods of carburetion and fuel injection, as is the case with many Otto cycle engine applications. Gaseous fuels can also be injected into the incoming air stream as is the case with propane or Compressed Natural Gas (CNG). Alternatively, fuel may be injected into the combustion chamber at or near the end of the compression phase or stroke, as is the case with Diesel engines as well as many modern Otto cycle engines. Ignition occurs in response to an electrical spark timed to occur in the vicinity of the end of the compression stroke in Otto cycle engines. In Diesel cycle engines, ignition is initiated by the charge being superheated to the self-ignition temperature of the fuel at the point at which the fuel is injected.

Generally, internal combustion engines are benchmarked to function based on a stoichiometric ratio of fuel to air whereby there is only a slight excess of air needed for stoichiometric, or near complete, combustion to occur. Stoichiometric combustion disadvantages include a relatively high level of air pollution products of combustion, notably in the areas of oxides of nitrogen and unburned hydrocarbons. Aggravating the emissions, power, and efficiency parameters is that at the moment of ignition with the current art, the fuel-air charge is not prepared to the optimal temperature to maximize the benefits of the aforesaid parameters. "Lean burn" art has improved the emissions problem to a limited degree by providing an excess of air above stoichiometric requirements. However, the excess air typically also has a nominal temperature that is too low. As such, so much heat is absorbed by the cold air during combustion that there are problems with a slow flame front and incomplete combustion.

In Diesel cycle combustion, in particular, high charge pressures may contribute to heterogeneous mixing of air and fuel that may cause localized "hot pockets" of combustion. A result can be incomplete combustion with attendant unburned particulates and high levels of oxides of nitrogen. Additionally, very high compression ratios are required to superheat the air to temperatures required to evaporate and spontaneously combust injected fuel.

There remains a need for improvements in charge preparation for internal combustion engines that will mitigate the problems discussed above.

SUMMARY

The present invention provides a method and apparatus for preparing a charge for an internal combustion engine such that the temperature of the charge is in the vicinity of the self ignition temperature of the fuel in the charge at or near the end of a compression stroke of the engine. The invention includes an internal combustion engine having a charge preparation system that includes an intake manifold which receives pressurized gas or air (in the form of an air-fuel mixture or simply in the form of air) from a supercharger, turbocharger, or other suitable compressing device. A proportioning valve is included and configured to control the charge temperature in the intake manifold by controlling heated and unheated proportions of compressed air and/or gas admitted into the manifold. A controller is provided to receive a signal indicative of intake manifold temperature from a temperature sensor disposed in the manifold. The controller compares the sensed or measured temperature to a desired or set point temperature and commands the proportioning valve to modify the heated and unheated proportions of the intake compressed air or gas. Heating of a portion of the compressed air is accomplished by exchanging heat with a waste heat stream from the engine by means of a heat exchanger. The proportioning valve, commanded by the controller, controls how much of the intake air or gas is heated by being ported through the heat exchanger and how much remains unheated due to being bypassed around the heat exchanger.

In another aspect of the invention, the pressurized air or air-fuel mixture forming the charge is directed through a straightener and tangentially along the wall of an intake valve chamber to induce a swirling flow pattern of the charge as the charge is admitted into a combustion chamber. Said straightener might be required of lower octane fuels such as gasoline, but said straightener might not be necessary for higher octane rated fuels such as CNG or propane.

DETAILED DESCRIPTION

The present invention provides a system for, and method of, preparing gaseous intake air for an internal combustion engine to produce a charge that is heated to the vicinity of the self ignition temperature of the fuel used to power the engine when the charge is admitted into the combustion chamber. Coupled with the utilization of intake air supercharging, heating the charge to just below the self-ignition, or auto-ignition temperature of the fuel permits lean air-fuel ratios as the excess air no longer meaningfully cools the combustion, reaction. Moreover, complete combustion and lowered levels of polluting compounds can be promoted.

Figure 1:
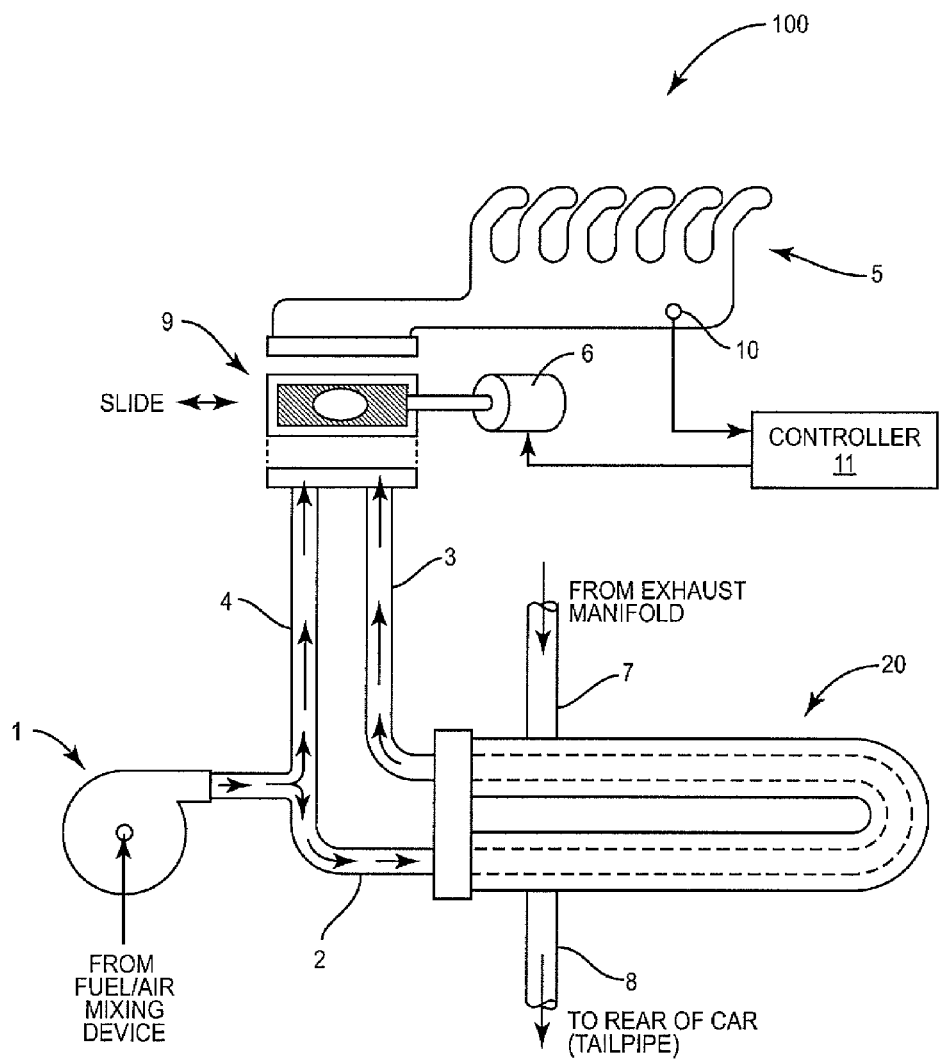
FIG. 1 is a schematic of the charge forming system of the present invention.

The system, indicated generally by the numeral 100 in FIG. 1, includes an internal combustion engine having an intake manifold 5 connected to and in fluid communication with an outlet of a proportioning valve 9. Conduits 3 and 4 are connected to and in fluid communication with respective inlets of proportioning valve 9. Conduit 3 is also in fluid communication with an outlet of a heat exchanger 20 such that air may be directed from the heat exchanger to one of the inlets of proportioning valve 9. Heat exchanger 20 is in fluid communication with a source of a heated fluid that is directed into the heat exchanger via a conduit 7 and exhausted there from via a conduit 8. Conduit 4 and a conduit 2 are connected to and in fluid communication with a high pressure outlet of a compressor or supercharger 1 such that a portion of pressurized air or air-fuel mixture leaving the supercharger passes through heat exchanger 20 and the remainder of the pressurized air or air-fuel mixture leaving the supercharger bypasses the heat exchanger. The present invention contemplates that the supercharger 1 will compress air or an air-fuel mixture. In some embodiments the supercharger 1 will compress intake air and the fuel will be added to the compressed air at an appropriate point downstream to form the air-fuel mixture. In other cases the fuel is added to the intake air to form an air-fuel mixture upstream of the supercharger or at the supercharger and in this case, the supercharger compresses the air-fuel mixture. Continuing to refer to the system, the system also includes a temperature probe 10 that is located in intake manifold 5 and is in operative communication with a controller 11. Also in operative communication with controller 11 is a motorized actuator 6 configured to actuate proportioning valve 9.

FIG. 1 illustrates an embodiment of the invention that may be applicable to Otto cycle engines such as gasoline, CNG, or propane powered engines in which fuel is mixed with air upstream of supercharger 1. In one embodiment, fuel is induced into intake air by a carburetor. In another embodiment, fuel may be injected into the intake air upstream of supercharger 1 utilizing a throttle body injection apparatus. Both carburetion and throttle body injection are well known in the art.

However, the present invention is not limited to application in Otto cycle engines nor is it limited to application in engines for which the fuel is added to intake air upstream of supercharger 1. In one embodiment, fuel may be injected downstream of the proportioning valve 9. For example, both Otto cycle (gasoline) and Diesel cycle engines are known to utilize individual cylinder fuel injection wherein the fuel is injected directly to the combustion chamber at or near the end of the compression stroke. Fuel injection is also commonly employed at the intake manifold discharge of each cylinder. These are variations that do not depart from the spirit and principles of the present invention. Furthermore, it is appreciated by those skilled in the art, that the present invention can be incorporated or used in various ways in an internal combustion engine without departing from the basic principles of the present invention.

Figure 2:
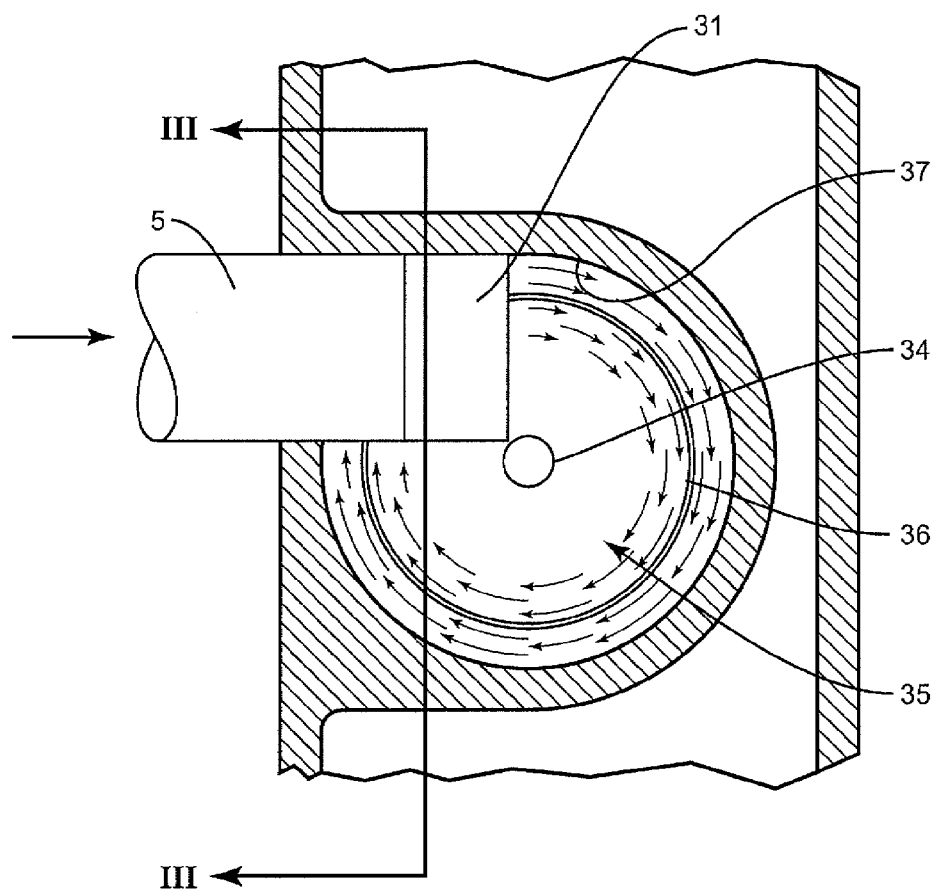
FIG. 2 is a fragmentary top sectional view of an intake port and valve with an air flow straightener of an embodiment of the charge forming system of the present invention.

In one embodiment of the present invention, the system includes means to establish a swirling flow pattern of the charge as it is admitted into the combustion chamber. The induction of adequate air swirl into the combustion chamber will minimize colliding pressure fronts to deliver a smooth combustion reaction further supporting complete combustion and reduction of pollutants. While combustion chamber swirl is generally accepted as a positive enhancement to the combustion process, induced swirl might be required only with low octane fuels such as gasoline, and might not be required of high octane fuels such as CNG or propane. Illustrated in FIGS. 2 and 3, the means includes an air flow straightener 31 disposed at the outlet of the intake manifold 5 and at least partially within the intake valve chamber 35 so that compressed air or air-fuel from the intake manifold may pass through the straightener. The straightener is located at an angle relative to the horizontal plane such that the spatial geometric combination of the straightener, intake valve 36, and the intake valve chamber 35 result in a spiral flow within the combustion cylinder 50 volume (FIG. 4). Whereas air flow characteristics are very dependent upon said spatial geometries and attendant air flow velocities, specific angles and locations of said straightener can vary significantly from one engine head design to another. These changes are variations of the same mechanism centered around aligning and directing air flow tangentially along the combustion chamber cylinder wall. Disposed in valve chamber 35 is an intake valve 36 that is actuated through valve stem 34 that is connected to the valve cam (not shown) in a manner well known in the art. As is appreciated by those of ordinary skill in the art, the operation of an engine includes the timed opening of valve 36 to permit a charge of air or air-fuel mixture to be admitted into the combustion chamber for combustion and a power stroke after valve closure.

Figure 3:
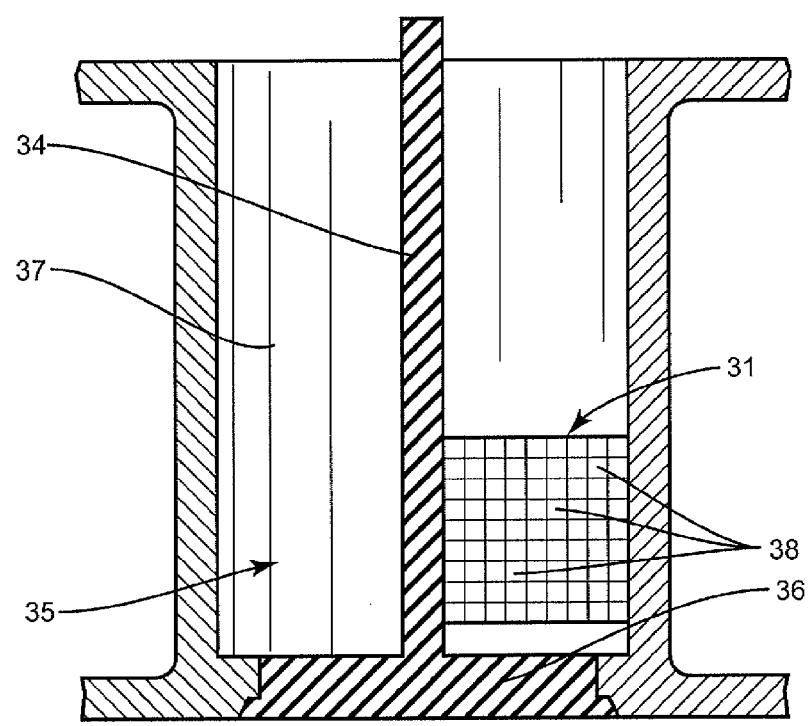
FIG. 3 is a fragmentary side sectional view of an intake port and valve with the air flow straightener of an embodiment of the charge forming system of the present invention.
Figure 4:
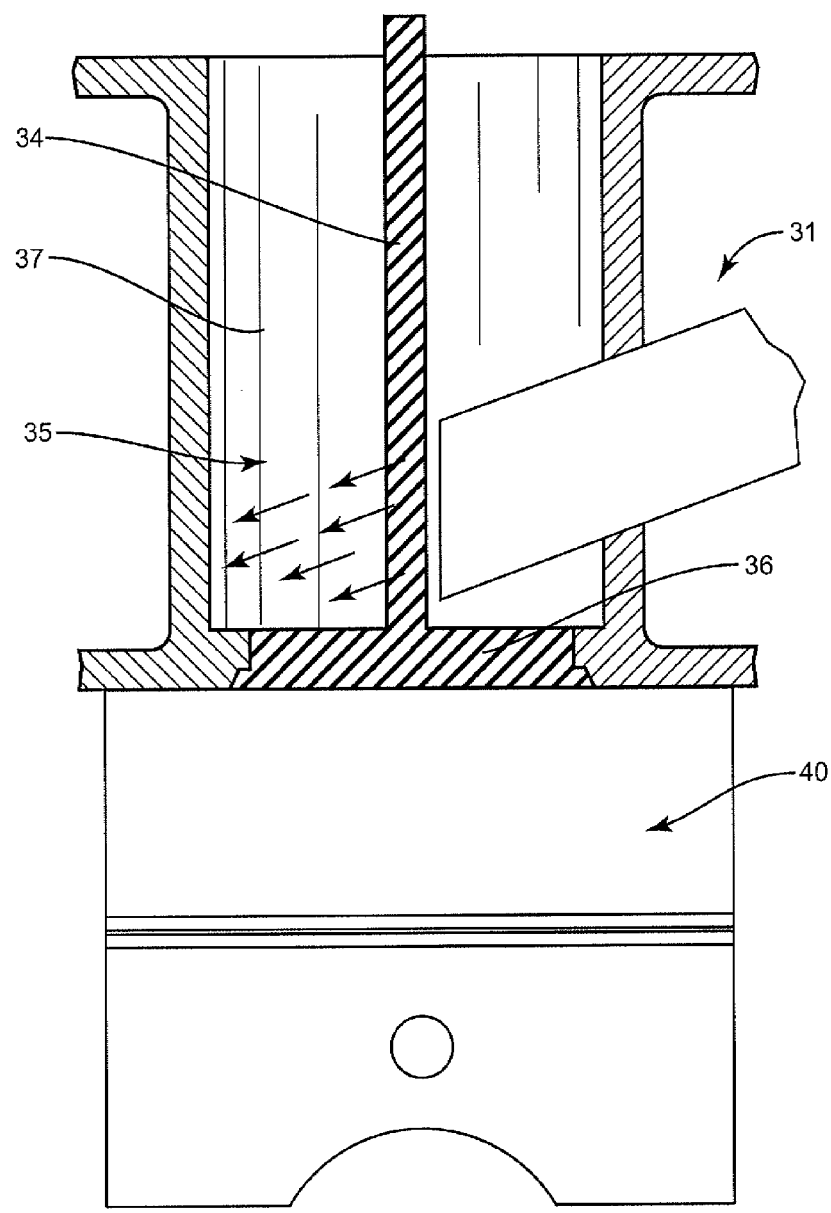
FIG. 4 is a fragmentary side view showing the orientation of the air flow straightener relative to the intake port.

Air flow straightener 31 includes an array of generally parallel passageways 38, as shown in FIG. 3, through which air may be caused to flow and exit from the straightener and into intake valve chamber 35 in a generally organized flow pattern. Straightener 31 is oriented so that the organized flow of air from the straightener is directed generally tangentially to an interior curved wall 37 of intake valve 35. The orientation of straightener 31, curved wall 37, and the curved wall of the engine cylinder 40, serves to induce a curved or swirling flow pattern when intake valve 36 opens. This swirling flow pattern may persist as the charge is admitted into the combustion chamber.

Turning now to the method of preparing a charge, reference is made again to the Figures. The method will be discussed for an embodiment that includes fuel addition by carburetion upstream of supercharger 1. It is understood that the method may be practiced with other fuel addition approaches as discussed above, and that description of the method as applicable to upstream fuel addition by carburetion is merely illustrative of the method.

Air-fuel mixture is induced into the inlet of supercharger 1 where the pressure of the mixture is increased. Pressurized air-fuel mixture from supercharger 1 is proportioned into two flow paths by proportioning valve 9 based on the heating requirement demanded to obtain a selected set point temperature of the air-fuel charge in intake manifold 5. The temperature of the air-fuel charge in manifold 5 is sensed by temperature probe 10 and compared with the set point temperature by controller 11. Proportional-integral-derivative (PID) control is a well known controller that may be employed, and controller 11 may function as a PID controller to compare the measured or sensed temperature in manifold 5 with the set point temperature and generate an actuating signal that commands proportioning valve 9 to a required setting. For example, if the temperature in manifold 5 is below the desired, or set point, temperature, PID controller 11 will command proportioning valve 9 to admit a smaller proportion of the air-fuel via conduit 4 and a larger proportion via conduit 3. This control action has the effect of directing a greater proportion of the pressurized air-fuel mixture through heat exchanger 20 to be heated before entering manifold 5 and allowing a smaller proportion of unheated air-fuel mixture to enter the manifold. The result will be an increase in temperature in manifold 5. Likewise, when the sensed temperature in manifold 5 is above the set point temperature, PID controller 11 will command proportioning valve 9 to admit a greater proportion of unheated air-fuel via conduit 4 and a smaller proportion via the pathway through conduit 2, heat exchanger 20, and conduit 3. The resulting effect will be a reduction of the temperature in manifold 5 as more unheated mixture is admitted and less heated mixture is admitted.

In an embodiment incorporating straightener 31, the conditioned charge is ported from manifold 5 and through the straightener to swirl into the combustion chamber when valve 36 opens.

Regarding the set point temperature, it must be appreciated that this temperature is established to promote thermally conditioning the air or the air-fuel mixture to a temperature such that when the charge is admitted into the combustion chamber, the temperature of the charge is set such that the endpoint temperature of said charge at or near the end of the compression stroke is in the vicinity of the temperature at which the fuel will self-ignite. This, combined with the effect of supercharger 1, reduces the work of compression that must be done by the engine and may result in a more efficient operation in addition to reduced pollution as has been discussed above. The set point temperature is the temperature in manifold 5 needed to stage the compression stroke isentropic process such that the charge temperature will be in the vicinity of the fuel self ignition temperature at or near the end of the isentropic compression stroke of the engine. Being in the vicinity or near the fuel self ignition temperature means being within approximately 20% of the fuel self ignition or auto ignition temperature.

As relates to a compression-ignition engine, pre-heating the incoming air to a defined set point reduces the magnitude of heat required solely from the isentropic compression process such that the work of compression is lowered, yet the compression top-dead-center temperature is equivalent to the traditional arrangement. It is realized that a power reduction might result per unit of engine swept volume, however, gains in emissions, fuel economy, and work of compression could well offset power losses.

The present invention relates to an electromechanical system that prepares said incoming charge such that said charge is always at the optimum temperature to achieve the most efficient combustion to render optimum power, economy, and/or emissions.

Especially with relatively unstable fuels such as commercial gasoline, adequate swirl mitigates pre-ignition events. More smoothly combusting fuels such as Compressed Natural Gas (CNG) are not as prone to pre-ignition events. However swirl enhances the quality and stability of any internal combustion process, thus is always a desired characteristic to optimize, but is not always required under all conditions.

In another embodiment of the current invention as relates to a Wankel Engine, potentially more efficiency gains are possible in economy, emissions, and power because as the Wankel controls inlet charge metering with ports instead of valves, higher incoming set point charge temperatures might be possible with commensurately lower compression ratios resulting in a higher percentage of engine waste heat recovery. Further, as the incoming charge is characterized by superior blend and temperature uniformity, the rotating combustion process should execute in a clearly superior fashion.

In the above discussion, there is reference to treating or conditioning the air or gas that makes up a part of an air-fuel mixture. It is to be appreciated that this treatment or conditioning of the air or gas can be achieved by treating or conditioning the air prior to being mixed with the fuel or after the air has been mixed with the fuel to form the air-fuel charge. Thus the specification is intended to cover heating and conditioning the air prior to the air being combined with fuel or after the air has been combined with the fuel.

The discussion herein has focused on a reciprocating type internal combustion engine. The present invention is suitable for application in a rotary engine having a rotor that is operative to drive a power output shaft of the engine. Therefore, the term "combustion chamber" as used herein means a conventional combustion chamber found in conventional reciprocating internal combustion engines as well as chambers or areas in a rotary engine where combustion occurs.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An internal combustion engine comprising:
    a) an engine having one or more combustion chambers;
    b) a compressor for receiving an air-fuel mixture and compressing the air-fuel mixture to form a compressed air-fuel mixture;
    c) a heat exchanger associated with the internal combustion engine;
    d) a control valve associated with the internal combustion engine;
    e) first and second outlets extending from the compressor wherein the first outlet is operative to direct a first stream of compressed air-fuel mixture to the control valve and the second outlet is operative to direct a second stream of the compressed air-fuel mixture to the heat exchanger where the second stream of compressed air-fuel mixture is heated and thereafter directed to the control valve;
    f) a controller operatively associated with the control valve for sending a signal to the control valve and causing the control valve to mix the first and second streams of compressed air fuel mixture together after the second stream of compressed air-fuel mixture has been heated;
    g) and wherein after the first and second streams of compressed air-fuel mixture have been mixed, the combined streams of compressed air-fuel mixtures is directed into one or more of the combustion chambers;
    h) a temperature probe positioned in an intake manifold of the internal combustion engine for sensing the temperature of the combined streams of compressed air-fuel mixture; and
    i) the controller configured to: (1) receive a temperature signal from the temperature probe that is indicative of the sensed temperature, (2) compare the sensed temperature with a set point temperature, and (3) generate an actuating signal and directed the actuating signal to the control valve where the actuating signal commands the control valve to a required setting for causing the temperature of the combined compressed air-fuel mixtures reaching the one or more combustion chambers to be at or near the self-ignition temperature of the fuel that forms a part of the combined compressed air-fuel mixtures.

2. The internal combustion engine of claim 1 further including an actuator for actuating the control valve; and wherein the controller is operatively connected to the actuator for controlling the actuator which in turn controls the operation of the control valve.

3. The internal combustion engine of claim 1 including means for engaging the air-fuel mixture prior to entry into the one or more combustion chambers and directing the air-fuel mixture into the one or more combustion chambers such that the air-fuel mixture assumes a swirling pattern as the air-fuel mixture enters the one or more combustion chambers.

4. The internal combustion engine of claim 1 including a flow straightener for receiving the combined compressed air-fuel mixtures and straightening the flow of the combined compressed air-fuel mixtures.

5. The internal combustion engine of claim 4 wherein each combustion chamber includes at least one intake port and wherein the flow straightener includes an outlet disposed adjacent the intake port of one combustion chamber.

6. The internal combustion engine of claim 1 wherein the controller is a PID controller.

7. A method for preparing a charge for an internal combustion engine comprising:
  a) compressing an air-fuel mixture with a compressor to form a compressed air-fuel mixture;
  b) splitting the compressed air-fuel mixture into at least first and second streams;
  c) directing the first stream of the compressed air-fuel mixture to a control valve;
  d) directing the second stream of the compressed air-fuel mixture to a heat exchanger;
  e) heating the second stream of the compressed air-fuel mixture in the heat exchanger;
  f) directing the heated stream of compressed air-fuel mixture to the control valve;
  g) utilizing the control valve to mix the first stream of compressed air-fuel mixture with the heated second stream of compressed air-fuel mixture to form a mixed stream of compressed air-fuel mixtures;
  h) directing the mixed stream of compressed air-fuel mixtures to one or more combustion chambers associated with the internal combustion engine; and
  i) controlling the temperature of the mixed stream of compressed air-fuel mixtures such that the mixed stream of compressed air-fuel mixtures directed to the one or more combustion chambers is at a temperature at or near the self-ignition temperature of the fuel that forms a part of the mixed stream of compressed air-fuel mixtures, controlling the temperature of the mixed stream of compressed air-fuel mixtures comprising:
    i) utilizing a temperature probe in an intake manifold of the internal combustion engine to sense the temperature of the mixed stream of compressed air-fuel mixture;
    ii) sending a temperature signal indicative of the sensed temperature of the mixed stream of compressed air-fuel mixtures from the temperature probe to a controller;
    iii) based on the temperature signal sent from the temperature probe to the controller, sending a control signal from the controller to the control valve and causing the control valve to mix the first stream of compressed air-fuel mixture with the second heated stream of compressed air-fuel mixture so as to cause the stream of mixed compressed air-fuel mixtures to be at a temperature at or near the self-ignition temperature of the fuel that forms a part of the mixed stream of compressed air-fuel mixtures.

8. The method of claim 7 wherein the control valve is a proportioning valve, and wherein the controller is operatively connected to an actuator that is in turn operatively connected to the proportioning valve for actuating the proportioning valve; and wherein the controller is operative to control the actuator.

9. The method of claim 7 including swirling the mixed stream of compressed air-fuel mixtures and directing the swirling air-fuel mixtures into the one or more combustion chambers.

10. The method of claim 7 including directing the mixed stream of compressed air-fuel mixtures into and through a flow straightener disposed downstream of the control valve and upstream of the one or more combustion chambers.

11. The method of claim 7 further including the controller comparing the sensed temperature by the temperature probe to the set point temperature, and based on the comparison, generating an actuating signal that is directed from the controller to the control valve where the actuating signal commands the control valve to a required setting.

12. An internal combustion engine, comprising:
  a) one or more combustion chambers with each combustion chamber including at least one intake port for receiving an air-fuel mixture;
  b) an intake valve assembly disposed adjacent each combustion chamber and including a valve wall, a valve chamber disposed interiorly of the wall, a valve stem and an valve disposed in the valve chamber;
  c) a flow straightener disposed in the intake valve assembly between the valve wall and the valve stem for receiving the air-fuel mixture;
  d) the flow straightener including a plurality of generally parallel extending chambers for dividing the air flow mixture into a plurality of streams that are directed generally straight through the flow straightener;
  e) the flow straightener including an outlet end that terminates in the valve chamber adjacent the intake port of the combustion chamber; and
  f) wherein the outlet of the flow straightener is oriented in the valve chamber relative to the intake port of the combustion chamber such that the streams of air-fuel mixture is directed from the outlet of the flow straightener, through the intake port of the combustion chamber and into the combustion chamber such that the streams of air-fuel mixture move in a swirling pattern through the combustion chamber.

13. The internal combustion engine of claim 12 including a compressor for receiving an air-fuel mixture and compressing the air-fuel mixture, the compressor producing two streams of compressed air-fuel mixture with one stream being directed to a control valve and another stream being directed to a heat exchanger where the air-fuel mixture is heated by the heat exchanger, and wherein the heated air-fuel mixture stream is directed to the control valve; and wherein the control valve proportions the two streams so as to produce a single stream of compressed air-fuel mixture having a temperature such that the temperature of the air-fuel mixture is at or near the self-ignition temperature of the fuel therein when the air-fuel mixture reaches the combustion chambers.

14. The internal combustion engine of claim 12 wherein the flow straightener is disposed at an angle with respect to the combustion chamber such that the air-fuel mixture emitted from the flow straightener is directed into the intake port of the combustion chamber.

15. The internal combustion engine of claim 12 wherein the air flow straightener is positioned relative to a wall of the combustion chamber such that the wall of the combustion chamber causes the streams of air-fuel mixture to move in a swirling pattern in the combustion chamber.

\* \* \* \* \*